United States Patent [19]

Clearfield

[11] Patent Number: 5,017,537

[45] Date of Patent: May 21, 1991

[54] PILLARING OF LAYERED COMPOUNDS

[75] Inventor: Abraham Clearfield, College Station, Tex.

[73] Assignee: The Texas A&M University System, College Station, Tex.

[21] Appl. No.: 382,059

[22] Filed: Jul. 14, 1989

Related U.S. Application Data

[63] Continuation of Ser. No. 142,731, Jan. 11, 1988, abandoned.

[51] Int. Cl.$^5$ .......................... B01J 29/04; B01J 29/06
[52] U.S. Cl. ...................................... 502/63; 502/62; 502/80; 502/84
[58] Field of Search ..................... 502/62, 63, 80, 84

[56] References Cited

U.S. PATENT DOCUMENTS

| | | | |
|---|---|---|---|
| 4,176,090 | 11/1979 | Vaughan et al. | 502/63 |
| 4,248,739 | 2/1981 | Vaughan et al. | 502/63 |
| 4,510,257 | 4/1985 | Lewis et al. | 502/84 |
| 4,593,013 | 6/1986 | Jacobson et al. | 502/525 |
| 4,637,991 | 1/1987 | Battiste et al. | 502/84 |
| 4,717,513 | 1/1988 | Lewis et al. | 502/84 |
| 4,719,191 | 1/1988 | Battiste et al. | 502/63 |
| 4,757,040 | 7/1988 | Guan et al. | 502/63 |

FOREIGN PATENT DOCUMENTS

| | | | |
|---|---|---|---|
| 880091 | 1/1988 | PCT Int'l Appl. | 502/63 |
| 880092 | 1/1988 | PCT Int'l Appl. | 502/63 |

*Primary Examiner*—Patrick P. Garvin
*Assistant Examiner*—E. D. Irzinski
*Attorney, Agent, or Firm*—Arnold, White & Durkee

[57] ABSTRACT

A process is disclosed for pillaring layered materials which do not swell appreciably in water. The process comprises first intercalating an amine or other neutral molecule such as an amide or dimethyl sulfoxide between the layers of the material to be pillared. This allows the subsequent incorporation of inorganic pillars which are more temperature stable than the intercalated amine.

15 Claims, 5 Drawing Sheets

PILLARING OF LAYERED COMPOUNDS

This application is a continuation of application Ser. No. 142,731, filed Jan. 11, 1988 and now abandoned.

BACKGROUND OF THE INVENTION

1. Field of the Invention

This invention relates to layered materials, especially those which have useful catalytic and adsorbent properties. More particularly, it relates to a process for increasing the interlayer distance of such materials by incorporating pillars comprising inorganic substances. This process introduces pores or empty spaces between the layers thereby enhancing the sorptive capacity and catalytic properties of the material.

2. Description of the Related Art

In the preceding two decades, a new class of two-dimensional porous materials has been synthesized from smectite clay minerals. Smectite clays are able to swell in water because of their low layer charge, and thus easily intercalate organic guest molecules or large inorganic polymers. In general, the organically pillared structures suffer from the thermal instability of the organic component. The temperature sensitivity of these materials limits their utility as catalysts. Since a major incentive for preparing these materials is to produce new, catalytically active, large pore structures, robust, temperature stable pillars are required. Consequently, attention has focused on the use of the aluminum Keggin ion $[Al_{13}O_4(OH)_{24} \cdot 12H_2O]^{7+}$ and the zirconium tetramer $[Zr(OH)_2 \cdot 12H_2O]_4^{8+}$ as pillars. A large literature has developed, details of which are given in recent reviews (see, e.g., T. J. Pinnavaia, Science, 220, 365 (1983) and A. Clearfield in "Surface Organo-metallic Chemistry," Proc. of NATO Workshop, May 25–30, 1986, Le Rouret, Fr. 1).

Clays as they occur in nature are rocks that may be consolidated or unconsolidated. Clays are composed of extremely fine crystals or particles of clay minerals with or without other rock or mineral particles. These crystals or particles are often colloidal in size and usually platy in shape. The clay minerals, mostly phyllosilicates, are hydrous silicates of aluminum, magnesium, iron, and other less abundant elements.

The very fine particles yield very large specific-surface areas that are physically sorptive and chemically surface-reactive. Many clay mineral crystals carry an excess negative electric charge owning to internal substitution by lower valent cations, and thereby increase internal reactivity in chemical combination and ion exchange. Catalysts made from various clay minerals are extensively used, e.g., in the cracking of heavy petroleum fractions. These catalysts are produced from halloysites, kaolinites, and bentonites composed of montmorillonite.

Smectites (montmorillonites) are the 2:1 clay minerals that carry a lattice charge and characteristically expand when solvated with water and alcohols, notably ethylene glycol and glycerol. In earlier literature, the term montmorillonite was used for both the group (now smectite) and the particular member of the group in which magnesium is a significant substituent for aluminum in the octahedral layer.

The cation-exchange capacity of smectite minerals is notably high, 80–90 meq or higher per 100 grams of air-dried clay. The crystal lattice is obviously weakly bonded. Moreover, the lattice of smectites is expandable between the silicate layers so that when the clay is soaked in water it may swell to several times its dry volume (e.g., bentonite clays).

The principal clay minerals are kaolinite, montmorillonite, and illite. These are actually three families of minerals since kaolinite has several modifications and since isomorphous substitution occurs in the latter two giving rise to other compositions having different mineral names. Closely associated with the above minerals are gibbsite, $Al(OH)_3$, diaspore, $HAlO_2$, and bauxite (of indefinite composition but usually given as $Al_2O_3 \cdot 2H_2O$ which is an intermediate between the first two). All clays have as the major constituents one or more of the above minerals or minerals of the above families.

Montmorillonites have the general formula: $X_yAl_2 (Al_ySi_{4-y}O_{10})(OH)_2$ where X is usually Na, Mg or Al. The montmorillonite group includes the minerals montmorillonite, nontronite, beidellite, hectorite, and saponite. The latter two are trioctahedral and the other three are dioctahedral. Extensive substitutions occur in the octahedral sites as well as substitutions of aluminum for silicon in the tetrahedral sites. Montmorillonite absorbs water readily with accompanying swelling. It is the principal mineral in bentonite and accounts for its high plasticity and usually very sticky nature. The structure of this group of minerals is like that of talc and is classified with the sheet or layer silicates.

Stable pillared interlayered clay compositions have been prepared by reacting smectic type clays with polymeric cationic hydroxy metal complexes of metals such as aluminum, zirconium and/or titanium. Vaughan et al., U.S. Pat. No. 4,176,090, describes a process in which naturally occurring or synthetic smectite type clays are reacted with aluminum chlorohydroxide complexes ("chlorhydrol"), and then heated to convert the hydrolyzed polymer complex into an inorganic oxide.

The general procedure described in Vaughan et al. comprises mixing a smectite clay with an aqueous solution of the polymeric cationic hydroxy metal complex. The mixture of clay and metal complex is maintained at a temperature up to 200° C. for up to 4 hours. The reacted clay solids are then recovered and heated at a temperature of 200–700° C. to decompose the hydrolyzed metal complex to a pillar of inorganic oxide. The introduction of discrete/non-continuous inorganic oxide particles between the clay layers is said to produce pillared interlayered clays possessing a unique internal micropore structure.

Another patent to Vaughan et al., U.S. Pat. No. 4,248,739, describes a similar preparation of pillared interlayered clays which uses a polymeric cationic hydroxy inorganic metal complex having a molecular weight in excess of 2000. The complex may be formed by a hydrolysis-polymerization reaction of chlorhydrol. This reaction may be base-catalyzed. A smectite clay is mixed with an aqueous solution of the high molecular weight polymeric cationic hydroxy metal complex, polymer or copolymer such that the weight ratio of clay to metal complex is from 3 to 1.

In the method of Vaughan et al., an expandable layer-type clay (smectite) is reacted with a polymeric cationic hydroxy metal complex of aluminum and/or zirconium. Upon calcination, the interlayered metal complex is decomposed to form "inorganic oxide pillars" between the expanded clay layers which are separated by a distance of about 6 to 16 angstroms. The resulting pillared interlayered clay products are said to possess a unique interconnected internal micropore structure in which more than half of the pores are less than about 30 angstroms in diameter.

Apparently, while the interlayered clay products possess some degree of ion exchange capacity, the ion exchange capability of the calcined interlayered clay product is not equivalent to the ion exchange capacity of the parent clay. In U.S. Pat. No. 4,271,043, Vaughan et al. describe a method for increasing the ion exchange capacity of such pillared interlayered clays which comprises treating the calcined product with a base, such as aqueous solutions of alkali metal or ammonium hydroxides or carbonates, or a gaseous basic reactant such as ammonia.

U.S. Pat. No. 4,238,364 to Shabtai describes cracking catalysts consisting of highly acidic forms of cross-linked smectites. The preferred method of preparation for these catalysts includes preparing acidic forms of the smectite (usually montmorillonite) and thereafter performing a non-stoichiometric (i.e., partial) cross-linking of the acidic smectite with oligomeric species of aluminum hydroxide. The cross-linked material is subsequently stabilized by heat treatment.

The process described in U.S. Pat. No. 4,238,364 "is performed with preservation of the structure of the smectite unit layers, as the cross-linking step affects only the interlamellar space of the smectite. This is fundamentally different from the methods used in the preparation of clay-based and clay/gel-based zeolite cracking catalysts, since in these cases the clay (smectite) structure is subjected to drastic structural changes during the catalyst preparation process."[col. 4, lines 25-32]

Shabtai describes the preparation and properties of non-functionalized cross-linked frameworks in U.S. Pat. No. 4,216,188. The process of preparing the cross-linked montmorillonite molecular sieves comprises interaction between montmorillonite, in the form of a colloidal solution containing fully separated unit layers, and a cross-linking agent, consisting of a buffered and aged colloidal solution of a metal hydroxide, dispersed in the form of low molecular weight oligomers.

SUMMARY OF THE INVENTION

Heretofore, only clays that swell in water, the so-called smectites, have been pillared. There exist, however, large classes of layered compounds which do not swell in water. Using the methods of the prior art, it has been difficult, if not impossible, to pillar these materials.

The process of the present invention provides a method for pillaring layered materials which do not swell appreciably in water. The process comprises first intercalating an amine or other neutral molecule such as an amide or dimethyl sulfoxide between the layers of the material to be pillared. This allows the subsequent incorporation of inorganic pillars which are more temperature stable than the intercalated amine.

DETAILED DESCRIPTION

Figure 1:
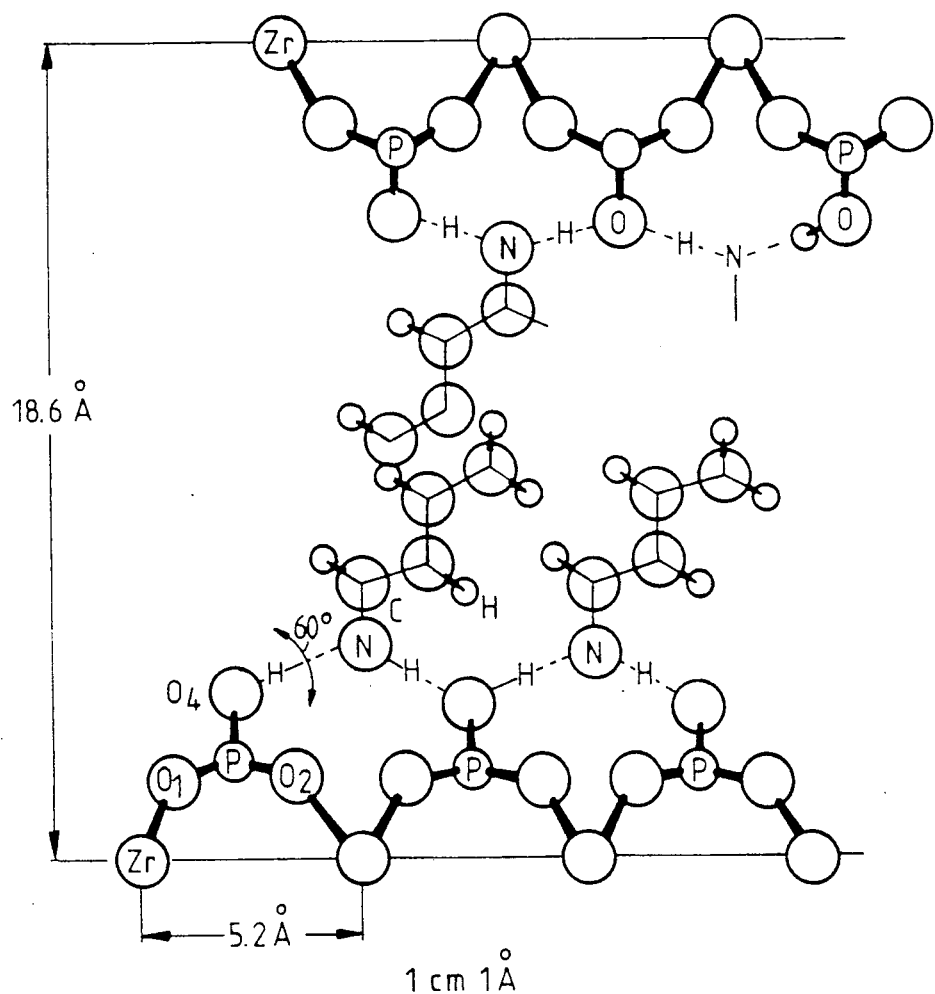
FIG. 1 is a schematic representation of a butylamine intercalate of α-zirconium phosphate having the formula: $(CH_3(CH_2)_3NH_3{}^+)_2Zr(PO_4{}^-)_2$.

The method of producing the novel pillared materials of the present invention generally comprises: (1) preparing the layered compound in the proton form so that it will accept amines; (2) intercalating an amine (or dimethyl sulfoxide or amide) between the layers so as to increase the interlayer distance; (3) incorporating a polyoxycation which serves as a pillar; and, (4) recovering the pillared species, e.g., by filtration or centrifugation. The pillared product may subsequently be heat treated to remove excess water.

Examples of layered materials which do not swell appreciably in water and which have potential utility as catalysts include:

1. Layered group IV phosphates of titanium, zirconium, cerium, thorium, germanium, tin, lead, and vanadium(IV) phosphates;

2. Layered titanates having the composition M$_2$Ti$_2$O$_5$, M$_2$Ti$_3$O$_7$, M$_2$Ti$_4$O$_9$, M$_2$Ti$_5$O$_{11}$, M$_2$Ti$_7$O$_{15}$, etc.;

3. Layered titanium niobates such as MTiNbO$_5$, M$_3$Ti$_5$NbO$_{14}$, MTi$_2$NbO$_7$, etc. where M is a univalent cation such as Li$^+$, Na$^+$, K$^+$, NH$_4{}^+$, and the like;

4. Antimonates such as KSbO$_3$·xH$_2$O and H$_3$Sb$_3$P$_2$O$_{14}$·H$_2$O and comparable niobates;

5. Manganates such as NaMnO$_2$, Na$_{0.7}$MnO$_2$ and Na$_{0.7}$MnO$_{2.25}$;

6. Layered silicates such as magadiite, H$_2$Si$_{14}$O$_{29}$, and clays which do not swell appreciably in water; and, 7. Other layered oxides such as V$_2$O$_5$, MoO$_3$, WO$_3$ and UO$_3$ and their derivatives such as Ag$_6$Mo$_{10}$O$_{33}$.

The cationic compounds are preferably first treated with dilute acid to convert them to the protonated or hydronium ion form. They are then contacted with an amine or any compound which will intercalate between the layers of the layered material and separate the layers. To incorporate the pillars, the intercalated material is subsequently contacted with a solution comprising the polyoxycation. While not wishing to be held to any particular theory, it is contemplated that this reaction takes place via an ion exchange mechanism. In the case of intercalated amines, it is further contemplated that an ammonium ion, $RNH_3^+$, is formed upon intercalation and this ammonium ion exchanges with the polyoxycation.

Particularly preferred swelling agents for proton-containing layered phases are polyether amines having the general formula:

$$H(OCH_2CH_2)_nNH_2$$

where n=4 or greater. The polyether portion of such molecules is extremely hydrophilic. Thus, when such amines are intercalated into layered materials, water diffuses in and spreads the layers even further apart.

Examples of cations which are considered suitable include:

1. Aluminum polymers such as $[Al_{13}O_4(OH)_{24} \cdot 12H_2O]^{7+}$;
2. The zirconium tetramer $[Zr(OH)_2 \cdot 4H_2O]_4^{8+}$;
3. Chromium polymeric species such as $Cr_2(OH)_2^{4+}$ and $Cr_3(OH)_4^{5+}$; and,
4. Bismuth polymers such as $[Bi_6O_4(OH)_4]^{6+}$.

The following examples illustrate the process as applied to α-titanium and zirconium phosphates, $Ti(HPO_4)_2 \cdot H_2O$ and $Zr(HPO_4)_2 \cdot H_2O$, and γ-zirconium and titanium phosphate, $Zr(HPO_4)_2 \cdot 2H_2O$ and $Ti(HPO_4)_2 \cdot H_2O$. These materials were prepared by the methods described in U.S. Pat. No. 3,416,884, Clearfield et al., *J. Phys. Chem.*, 73 3424 (1969) and Clearfield et al., *J. Inorg. Nucl. Chem.*, 30 2249 (1968), the teachings of which are incorporated by reference. The x-ray powder patterns reported herein were obtained with CuKα radiation on a Seifert-Scintag PAD-II automated powder diffractometer.

FIG. 1 is a schematic drawing of α-zirconium (α-ZrP) or titanium phosphate (α-TiP) with butylamine intercalated between the layers. In this condition the layers are 18.6Å apart, whereas the interlayer distance without the amine present is 7.6Å.

Figure 2:
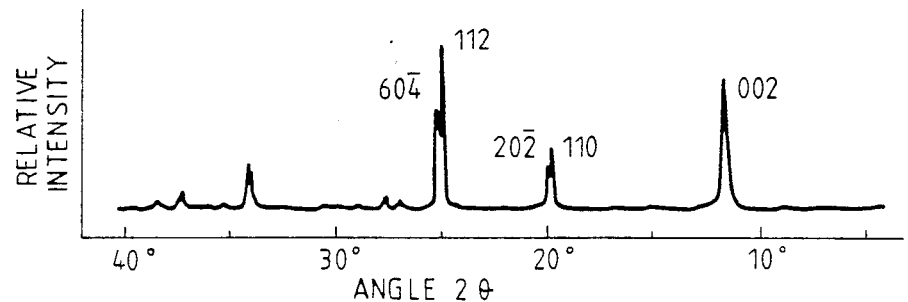
FIG. 2 shows the indexing of the first five reflections in the x-ray powder diffraction pattern of an α-zirconium phosphate which was prepared by refluxing the amorphous gel for 48 hours in 12-molar phosphoric acid. The first peak, labeled "002", represents the interlayer spacing.

Table 1 gives a partial listing of the x-ray diffraction powder pattern of α-zirconium phosphate, $Zr(HPO_4)_2 \cdot H_2O$, (Column A) and its butylamine intercalate (Column B), $[CH_3(CH_3(CH_2)_3NH_3^+]_2Zr(PO_4)_2$. Each of the powder patterns consists of the d-spacings in angstroms and their relative intensities (relative to the highest peak) $I/I_o$. A portion of the x-ray pattern of α-zirconium phosphate which corresponds to the Table is shown in FIG. 2. The first listed d-spacing of layered compounds is usually the interlayer spacing and bears an index of (002), and this is true in the present case. The value of the interlayer spacing of α-zirconium phosphate is seen to be 7.6Å and that of its butylamine intercalate (Column 1B) 18.6Å.

TABLE 1

| | X-ray Diffraction Powder Patterns of α-Zirconium Phosphate (A) and the α-ZrP n-Butylamine Intercalate (B) | | | | |
|---|---|---|---|---|---|
| α-ZrP | | | α-ZrP/n-butylamine | | |
| d (Å) | I/Io (·100) (A) | Index (hkl) | d (Å) | I/Io (·100) (B) | Index (hkl) |
| 7.56 | 75 | (002) | 18.6 | 100 | (002) |
| 4.48 | 40 | (110) | 9.33 | 10 | (004) |

TABLE 1-continued

| | X-ray Diffraction Powder Patterns of α-Zirconium Phosphate (A) and the α-ZrP n-Butylamine Intercalate (B) | | | | |
|---|---|---|---|---|---|
| α-ZrP | | | α-ZrP/n-butylamine | | |
| d (Å) | I/Io (·100) (A) | Index (hkl) | d (Å) | I/Io (·100) (B) | Index (hkl) |
| 4.45 | 25 | (202) | 6.20 | 3.5 | (006) |
| 3.57 | 100 | (112) | 4.61 | 4.5 | (008) |
| 3.52 | 55 | (604) | 4.54 | 4.0 | |
| 3.29 | 5 | | 4.08 | 3.5 | |
| 3.21 | 5 | | 4.0 | 3.5 | |
| 3.08 | 5 | | 3.64 | 2.5 | |
| 3.02 | 2 | | 2.65 | 7.0 | |
| 2.63 | 30 | | | | |
| 2.61 | 35 | | | | |

Figure 3:
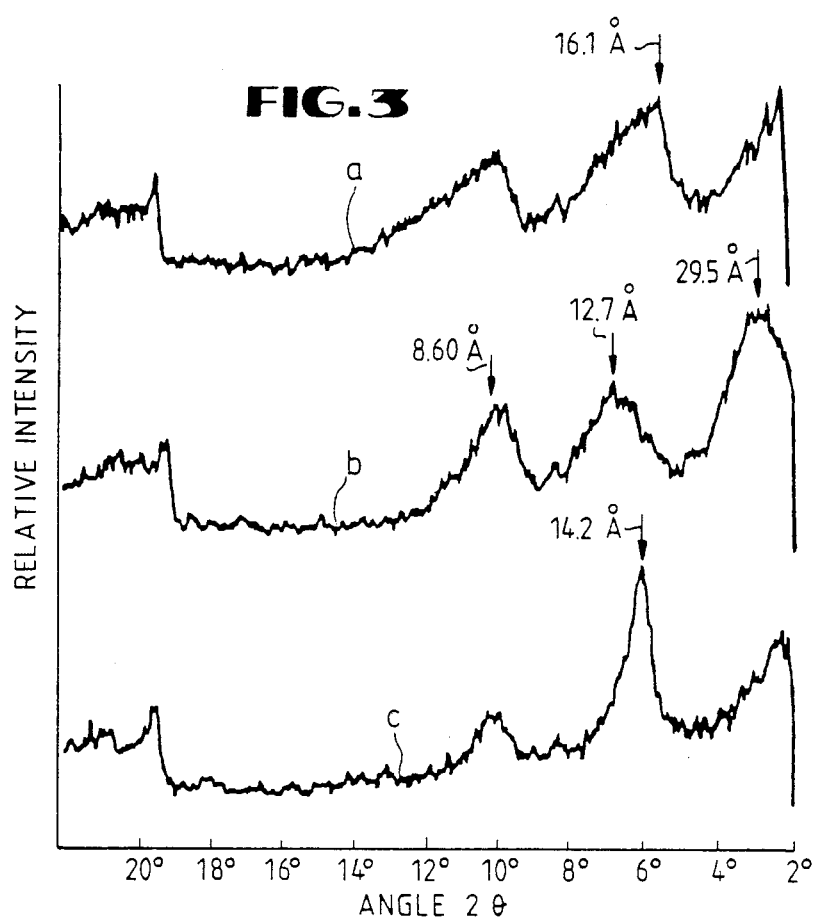
FIG. 3 depicts the x-ray powder diffraction pattern of three α-zirconium phosphates pillared with the alluminum Keggin ion. Curve a corresponds to a product prepared from an α-zirconium phosphate obtained by refluxing the amorphous gel for 15 hours in 12-molar phosphoric acid. This product exhibited a surface area (degassed at 200° C.) of 35 m$^2$/g. Curve b corresponds to a product prepared from an α-zirconium phosphate obtained by refluxing the amorphous gel for 336 hours in 12-molar phosophoric acid. This product exhibited a surface area (degassed at 200° C.) of 35 m$^2$/g. Curve c corresponds to a product prepared from an α-zirconium phosphate obtained by refluxing the amorphous gel for 48 hours in 9-molar phisphoric acid. This product exhibited a surface area (degassed at 200° C.) of 37 m$^2$/g.

FIG. 3 shows the x-ray diffraction patterns of three α-zirconium phosphates after each has been pillared using an aluminum hydroxychloride solution. The distinct crystalline pattern as seen in FIG. 2 is no longer evident as the layers become somewhat disordered by the intrusion of the large aluminum polymer. Nevertheless, the first peak is still that of the interlayer spacing. It is seen in curve c that this value is 14.2Å. Thus, the original value of 7.6Å has been increased by the aluminum pillars to a value of 14.2Å.

Figure 4A:
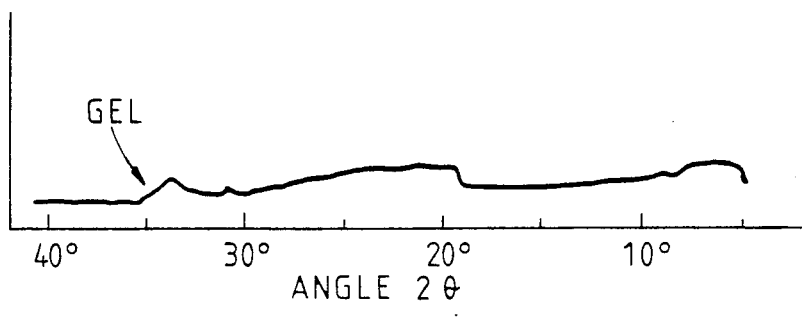
FIG. 4 shows a portion of the x-ray powder diffraction patterns of an α-zirconium phosphate in various stages of crystal growth starting with the amorphous gel. The samples were refluxed for 48 hours in phosphoric acid. The particular acid concentration employed for each sample is indicated in the individual panel corresponding to that sample.
Figure 4B:
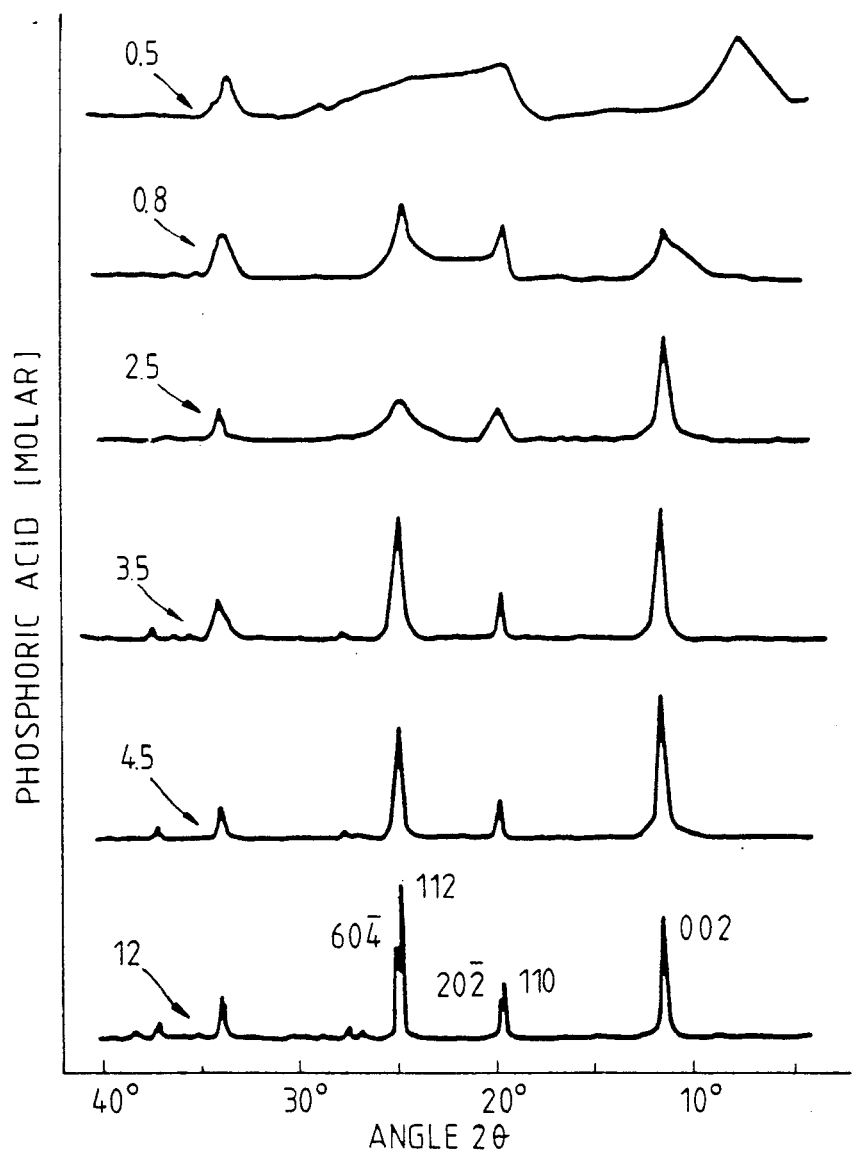

X-ray patterns labelled b and a in FIG. 3 are those of other samples of pillared α-zirconium phosphate. It is contemplated that the apparent differences may be the result of different crystallinities of the original zirconium phosphate. In preparing α-zirconium phosphates a soluble zirconium salt is added to phosphoric acid, $H_3PO_4$, to yield a gel whose x-ray pattern is shown in FIG. 4 (labelled "Gel"). This pattern is typical of a noncrystalline (or amorphous) product. If the gel is then refluxed in a phosphoric acid solution, it will crystallize slowly. Complete crystallinity requires refluxing in 12M $H_3PO_4$ for more than 400 hours. The different degrees of crystallinity obtained by the reflux treatment are shown in FIG. 4. The number used to identify each pattern is the concentration (in moles per liter) of $H_3PO_4$ used to prepare the material. Each sample was refluxed for 48 hours.

EXAMPLE 1

γ-Titanium phosphate has the formula $Ti(HPO_4)_2 \cdot 2H_2O$ and an interlayer spacing of 11.9 angstroms. Its x-ray powder diffraction pattern is tabulated in Table 2A. One gram of the microcrystalline γ-titanium phosphate was shaken with a 3.8% by weight solution of the polymeric aluminum cation $[Al_{13}O_4(OH)_{24} \cdot 12H_2O]^{7+}$ (the "Keggin ion") for three hours. The solution comprising the polyoxycation was prepared as described below. The x-ray diffraction pattern of the solid recovered at the end of the three hour shaking period was the same as that shown in Table 2A. Thus, no pillaring of the layers occurred.

TABLE 2

| X-ray Diffraction Powder Patterns of (A) γ-Titanium Phosphate (γ-TiP), (B) Its Butylamine Intercalate and (C) γ-TiP Pillared With the Al₁₃ Keggin Ion | | | | | |
|---|---|---|---|---|---|
| γ-TiP (A) | | γ-TiP/n-butylamine (B) | | γ-TiP/Al₁₃ (C) | |
| d (Å) | I/Io (·100) | d (Å) | I/Io (·100) | d (Å) | I/Io (·100) |
| 11.9 | 100 | 20.3 | off-scale | 15.5 | 100 |
| 5.78 | 0.15 | 10.15 | 100 | 8.8 | 30 |

TABLE 2-continued

X-ray Diffraction Powder Patterns of
(A) γ-Titanium Phosphate (γ-TiP),
(B) Its Butylamine Intercalate and
(C) γ-TiP Pillared With the Al₁₃ Keggin Ion

| γ-TiP (A) | | γ-TiP/n-butylamine (B) | | γ-TiP/Al₁₃ (C) | |
|---|---|---|---|---|---|
| d (Å) | I/Io (×100) | d (Å) | I/Io (×100) | d (Å) | I/Io (×100) |
| 5.56 | 2.9 | 6.77 | 5.3 | | |
| 4.30 | 4.0 | 4.98 | 3.0 | | |
| 3.95 | 0.10 | 4.07 | 22.5 | | |
| 3.86 | 1.0 | 3.87 | 5.5 | | |
| 3.56 | 0.25 | 3.81 | 5.4 | | |
| 3.45 | 14 | 3.77 | 10.5 | | |
| 3.30 | 0.85 | 3.41 | 9.8 | | |
| 3.17 | 0.50 | 3.36 | 7.5 | | |
| 3.06 | 0.50 | 3.34 | 13.0 | | |
| 3.03 | 1.8 | 2.54 | 7.5 | | |
| 2.79 | 1.5 | 2.26 | 6.0 | | |

There are at least two methods by which the large Al₁₃ Keggin ion used to pillar layered compounds may be prepared. In one such method, sodium hydroxide (NaOH) is added to a solution of aluminum chloride (AlCl₃). In another method, aluminum hydroxide (Al(OH)₃) is dissolved in AlCl₃. The latter method is preferred inasmuch as it avoids the introduction of sodium ions (Na⁺) into the system. Since sodium ions are preferentially exchanged by the amine-intercalated zirconium or titanium phosphate, once they displace the amine, no pillaring takes place.

Figure 8:
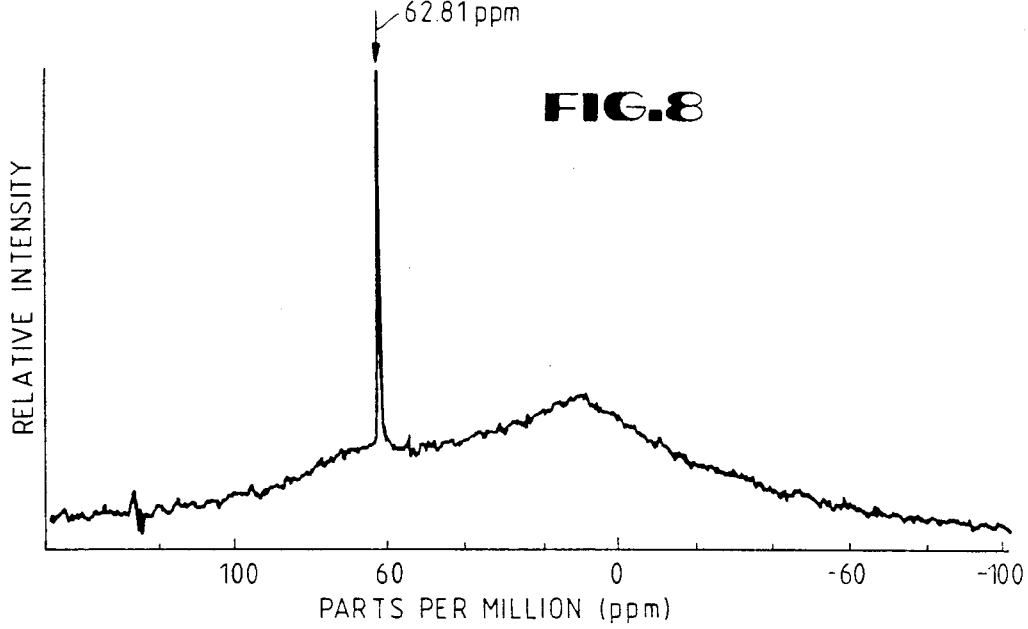
FIG. 8 is an $^{27}$Al NMR spectrum of a 10% by weight solution of aluminum chlorhydrate which was prepared approximately one month prior to the date on which this spectrum was obtained.
Figure 6:
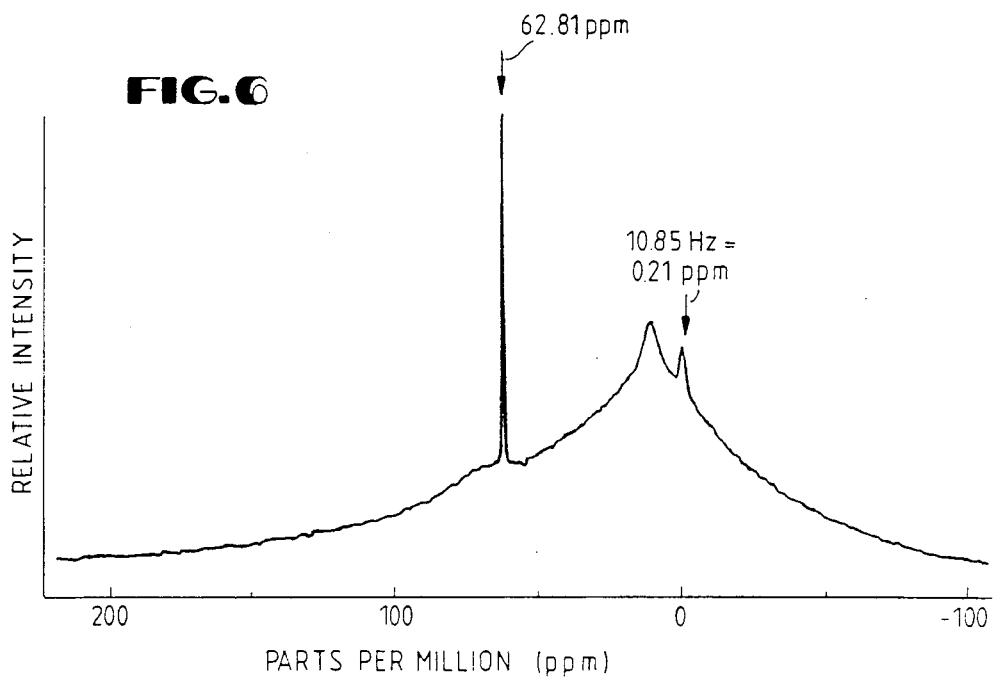
FIG. 6 is an $^{27}$Al NMR spectrum of a 50% by weight solution of aluminum chlorhydrate diluted 1:5 in D$_2$O.
Figure 7:
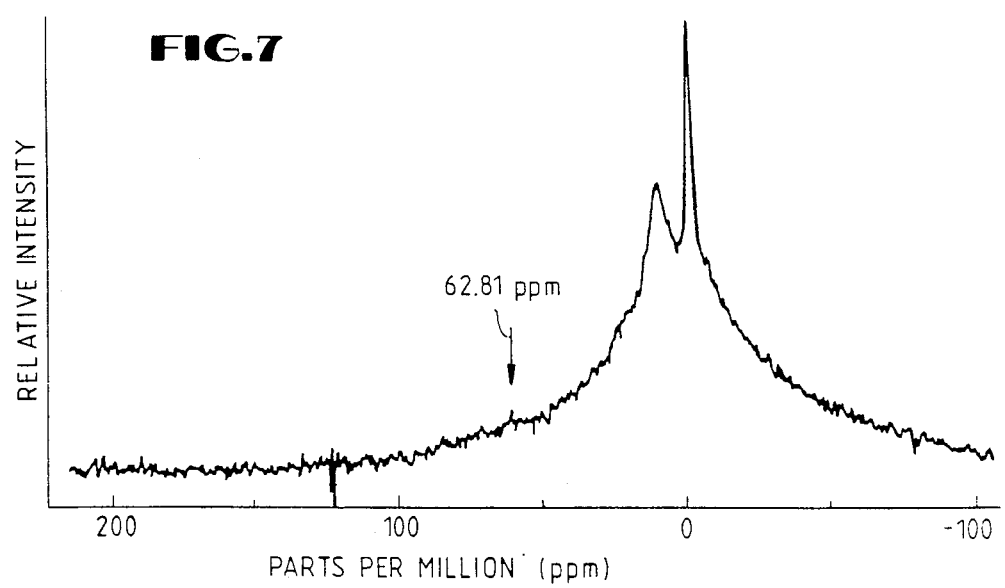
FIG. 7 is an $^{27}$Al NMR spectrum of a 50% by weight solution of aluminum chlorhydrate which was prepared approximately six months prior to the date on which this spectrum was obtained.

In all examples disclosed herein, the polyoxycation was prepared from an aluminum chlorohydrate solution obtained by dissolving a commercially available powder known as MICRO-DRY® in water. MICRO-DRY® is a registered trademark of the Armour Pharmaceutical Co. d.b.a. Reheis Chemical Company, Chicago, Ill. A typical lot analysis indicates that MICRO-DRY® aluminum chlorohydrate as a solid contains about 46.2% $Al_2O_3$ and about 16.4% Cl⁻ (Al:Cl = 1.96:1). The pH of a 15% solution is between 4.0 and 4.4. MICRO-DRY® has the approximate formula: $Al_2(OH)_5Cl \cdot nH_2O$. The $^{27}Al$ NMR spectrum of a freshly prepared 50% solution of MICRO-DRY® diluted 1:5 in $D_2O$ is shown in FIG. 6. This spectrum, as well as the NMR spectra shown in FIGS. 7 and 8, is referenced to sodium aluminate, $Na^+ Al(OH)_4^-$ in solution. The peakk at 63 ppm is due to the Keggin ion $[Al_{13}O_4(OH)_{24} \cdot 12H_2O]^{7+}$ and that at −0.2 ppm results from the presence of the monomeric species $Al(H_2O)_6^{3+}$. The peak intensity (actually the area under the peak) corresponds to the amount of each species present in the sample. Although the intensities of the two peaks are approximately the same, much more aluminum is present in the form of Keggin ion inasmuch as there are 13 aluminum atoms in each Keggin ion as opposed to one aluminum atom in each $Al^{3+}$ ion.

The large hump in the spectrum which has a maximum at about 13 ppm is thought to be due to the presence of a series of polymers ranging from the dimer upward beyond the Al₁₃ Keggin ion. The maximum at 13 ppm is believed to correspond to the dimer, $[Al_2(OH)_2]^{4+}$. As the solution ages, the concentration of the Keggin ion decreases while the concentration of other aluminum species increases until (as shown in FIG. 7) the Keggin ion is barely present. FIG. 7 is an $^{27}Al$ NMR spectrum of a 50% solution of MICRO-DRY® aluminum chlorohydrate which has aged six months. Note that the signal corresponding to the Keggin ion is almost gone and those corresponding to other species have increased significantly. This process may take a week to several months.

It has been found, however, that when the concentration of MICRO-DRY® aluminum chlorhydrate solutions is limited to a maximum of about 10% by weight, the major species is the Keggin ion and, even more importantly, such solutions remain stable for at least nine months. Practically no variation in the relative amounts of the aluminum species present was observed by $^{27}Al$ NMR over this period of time. Moreover, subsequent dilution of such solutions did not produce a change in the relative concentration of the Keggin ion.

FIG. 8 is the $^{27}Al$ NMR spectrum of a 10% MICRO-DRY® aluminum chlorohydrate solution which has been aged one month. Note that the major peak in the spectrum is that corresponding to the Keggin ion and that there is very little contribution from other aluminum species. It has been observed that after a period of nine months, there are no appreciable changes in the spectrum.

EXAMPLE II

The experiment reported in Example I, above, was repeated but with the shaking performed at an elevated temperature (70° C.). Again, no incorporation of the aluminum cation between the layers of the γ-titanium phosphate was observed.

EXAMPLE III

One gram of γ-titanium phosphate having a surface area of 2 m²/g was added to 100 milliliters of 0.1M aqueous n-butylamine solution. This mixture was shaken at room temperature for four hours. The x-ray powder diffraction pattern of the filtered and washed solid resulting from this treatment is tabulated in Table 2B. The x-ray pattern shows that the amine has been intercalated between the layers of the γ-titanium phosphate as a bilayer such as shown in FIG. 1. However, the interlayer spacing in the γ-phase is 20.3A.

Butylamine readily intercalates into the layered group IV phosphates to the extent of two moles per formula weight of phosphate. In the process, the interlayer spacing increases from 7.6 to 18.6 angstroms in the α-zirconium and titanium phosphates and from about 12 to 20.3 angstroms for the γ-phases. This increase in interlayer spacing then allows the exchange of polymeric aluminum species for alkyl ammonium ions to take place.

Figure 5:
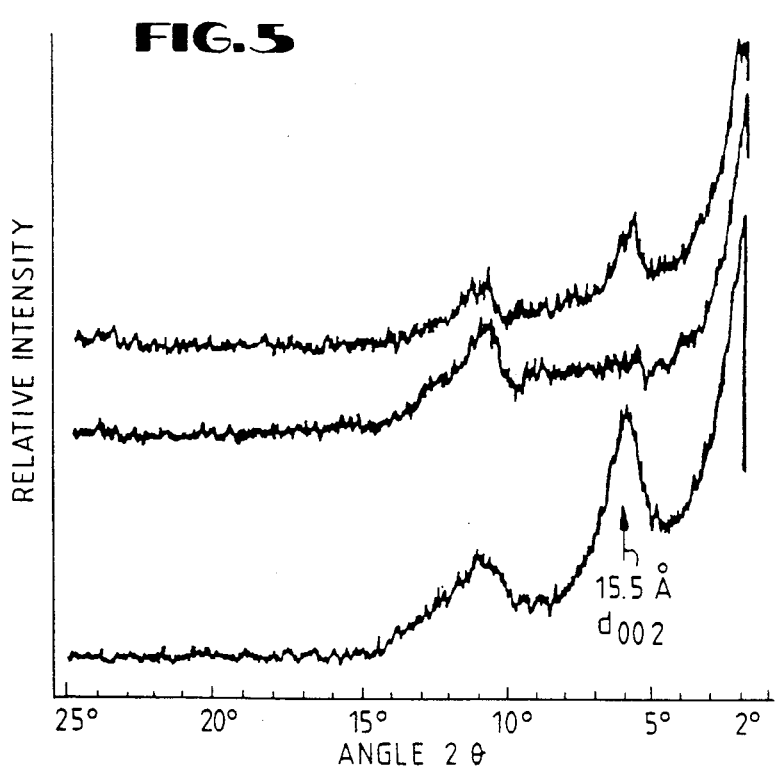
FIG. 5 shows a portion of the x-ray powder diffraction patterns of various pillared γ-titanium phosphates.

Sixteen milliliters of a 15% by weight aluminum hydroxychloride solution were subsequently added to a slurry of the intercalated solid γ-titanium phosphate (1 g in 35 mL water). This mixture was maintained at 70° C. for 90 minutes and then cooled to room temperature, filtered, washed and air dried. The resultant product contained 15% Al and exhibited a surface area of 82 m²/g (by $N_2$ BET sorption) after dewatering in a vacuum at 270° C. The x-ray powder diffraction pattern of this material is shown in FIG. 5 and tabulated in Table 2C. The first reflection is $d_{002}$ and represents the interlayer spacing produced by the pillaring. It will be noted that this value (15.5 angstroms) indicates an expanded size as compared to the interlayer spacing of the untreated material (11.9 angstroms). Thus, from the interlayer spacing and the increase in surface area, it is readily apparent that aluminum cations were incorporated between the layers. However, the pillaring process disorders the layers resulting in broadened peaks of low intensity. This is also true of the pillared clays.

EXAMPLE IV

α-Titanium phosphate, α-Ti(HPO$_4$)$_2$·H$_2$O, having an interlayer spacing of 7.6 angstroms and a surface area of 2 m$^2$/g was treated with butylamine by the method described in Example III. After shaking for one hour the solid was filtered off and added to 30 milliliters of a 30% aqueous aluminum hydroxychloride solution and the mixture heated at 70° C. for 90 minutes. Six milliliters of a 30% aluminum hydroxychloride solution were added to this slurry and the mixture heated at 70° C. for 90 minutes. X-ray data for the α-TiP and its butylamine intercalate are given in Table 3.

The resulting washed and air-dried solid was found to contain 10.9% Al and to have a surface area of 139 m$^2$/g. After heating to 300° C. for two hours, the surface area was found to be 95 m$^2$/g, indicating that the porosity was retained to a large extent. The x-ray powder diffraction patterns of the untreated α-titanium phosphate, the butylamine intercalate, and the aluminum-pillared product are tabulated in Table 3. The increased interlayer spacing of the aluminum-containing product and its increased porosity relative to that of the starting material indicate that pillaring has obtained. (See FIG. 5.)

TABLE 3

X-ray Diffraction Powder Patterns of (A) α-Titanium Phosphate (α-TiP) and (B) its n-Butylamine Intercalate

| α-TiP (A) | | α-TiP/n-butylamine (B) | |
|---|---|---|---|
| d (Å) | I/Io (· 100) | d (Å) | I/Io (· 100) |
| 7.59 | 100 | 19.2 | 100 |
| 4.28 | 14 | 9.56 | 16 |
| 4.26 | 14 | 6.36 | 6 |
| 4.07 | 4 | 4.46 | 3 |
| 3.47 | 94 | 4.07 | 4 |
| 3.44 | 55 | 4.05 | 7 |
| 3.17 | 5 | 3.46 | 14 |
| 3.05 | 4 | 3.43 | 9 |
| 2.63 | 7 | | |
| 2.61 | 5 | | |
| 2.54 | 14 | | |
| 2.51 | 16 | | |

EXAMPLE V

One gram of γ-titanium phosphate was treated with 20 milliliters of 1N aqueous butylamine solution for two hours. The solids were subsequently filtered off and added to a solution prepared by diluting 10 milliliters of a 30% aluminum hydroxychloride aqueous solution to 50 milliliters. This mixture was maintained at 70° C. for 90 minutes in a water bath, then filtered and air dried. The resulting product was found to have a 14-angstrom interlayer spacing and a surface area of 121 m$^2$/g after being dried under vacuum at 200° C.

The dried product sorbed 23% of its weight in water when exposed to the atmosphere (80% relative humidity) and 4.5% of its weight in cyclohexane at 25° C. These results indicate that a pillared product was produced.

EXAMPLE VI

A sample of pillared γ-titanium phosphate prepared as described in Example V (i.e., not heat treated) was found to contain 11% Al and to have a surface area of 52 m$^2$/g. Virtually all the aluminum was extracted upon treatment with 1M HNO$_3$ at 25° C. for 24 hours. However, following this acid treatment the surface area was found to be 91 m$^2$/g, which suggests that removal of the large aluminum cation left considerable void space between the layers. The aluminum-free product was found to have an interlayer spacing of 11.9 angstroms. After being heated to 330° C. the measured surface area was 73 m$^2$/g.

EXAMPLE VII

One gram of α-zirconium phosphate, Zr(HPO$_4$)$_2$·H$_2$O, having an interlayer spacing of 7.6 angstroms and the x-ray diffraction pattern shown in Table 1, Column A, was treated at room temperature with 100 milliliters of 0.1M aqueous butylamine solution. Following treatment, the x-ray pattern changed to that shown in Table 1, Column B. The interlayer spacing of the intercalated zirconium phosphate is 18.6 angstroms.

The solid intercalate was filtered off and added to a solution of 40 milliliters of a 10% aluminum hydroxychloride aqueous solution and heated at 70° C. for two hours. The washed and air-dried product contained 8.3% Al and had an interlayer spacing of 13.6 angstroms. This is an increase of 6 angstroms over the original values. The surface area increased from 2 m$^2$/g to 35 m$^2$/g.

The aluminum content of the pillared zirconium phosphate was found to vary from 5.6% Al to 13% Al, depending upon the concentration of aluminum hydroxychloride used as well as the temperature and length of treatment. Temperatures of about 35° C. to boiling may be used, the preferred temperature range being from about 60 to about 80° C.

The interlayer spacing was also found to vary from 13.0 to 15.1 angstroms for the α-type compounds. Since the Al$_{13}$ cation (the Keggin ion) has the shape of a prolate spheroid having approximate dimensions of 7 × 9 angstroms, when the cation is oriented with its long axis parallel to the layers of the layered material, the interlayer distance is expected to be 13.6 to 14.6 angstroms and when perpendicular, 15.6 to 16.6 angstroms.

The smaller dimension results from the fact that the actual thickness of the layer in α-zirconium phosphate is 6.6 angstroms. The presence of one mole of water between the layers of α-layered compounds accounts for the observed value of 7.6 angstroms. Thus, the increase in interlayer distance which obtains upon pillaring is close to the expected value.

X-ray diffractograms of some typical products are shown in FIG. 3. Samples a and b fall within the expected range of interlayer spacing, but the pattern for sample c indicates an interlayer spacing of 29.5 angstroms. It is contemplated that this large spacing is due to a phenomenon known as "staging." In staging, the aluminum cation does not become inserted between each layer, but rather every other layer or every third layer. Thus, the repeat distance is the sum of the pillared and unpillared layers. In the present example, the sum of two non-intercalated layers (7.6 × 2) plus one pillared layer (approximately 14.3 angstroms) equals 29.5 angstroms.

It is possible that sample c may be a mixture which comprises some 100% pillared materials. It is thought that the broad peak observed in the diffractogram at 12.7 to 14 angstroms is an indication of this possibility.

Analysis of more than a dozen pillared samples of α-zirconium phosphate showed that they contained variable aluminum contents ranging from 7.4% to 13.8% on a dry basis. Moreover, the interlayer spacings varied from 13.0 to 16.1 angstroms and there was no apparent correlation between the aluminum content and the interlaying d-spacing. However, it was found that when the zirconium phosphate was highly crystalline, there appeared to be a greater tendency to form the products having 24 to 30-angstrom interlayer spacings.

It has been shown that the degree of crystallinity of an α-zirconium phosphate is strongly dependent on the concentration of $H_3PO_4$ in which the gel is refluxed, and on the reflux time. See, e.g., A. Clearfield, A. Oskarsson and C. Oskarsson, "Ion Exchange and Membranes," 1, 91 (1972). See also A. Clearfield, "Inorganic Ion Exchange Materials," A. Clearfield, Ed., CRC Press, Boca Raton, Fl., 1982, pp. 6-16. Refluxing in 12M $H_3PO_4$ for 14 days results in crystallites of 1 to 2 micrometer average size. These crystallites tended to yield pillared products having the larger (27-30 angstrom) interlayer spacings. The less crystalline zirconium phosphate (refluxed in 12M $H_3PO_4$ for 15 hours) yielded products of the type represented by samples a and b in FIG. 3. Surface areas of all the pillared zirconium phosphates were in the range 30 to 35 m$^2$/g as compared to 1 to 8 m$^2$/g for the unpillared phosphates. Moreover, the pillared products did not intercalate amines or ammonia, nor did they sorb molecules such as isopropanol into the interlamellar space. This suggests that the zirconium phosphate products are non-porous and the pillars have stuffed the interlamellar regions.

In contradistinction, both α- and γ-titanium phosphate yielded pillared products having surface areas of 50-185 m$^2$/g and these products sorbed relatively large molecules, as shown in Table 4. The pillared products were degassed at 200° C. for 12 hours prior to exposure to the sorbate. Large amounts of perfluorotributylamine (PFTBA), which has a kinetic diameter of 10 angstroms, were sorbed. The porous pillared titanium phosphates retained more than 70% of their surface area after heating to 400° C. for 2 hours. Unpillared titanium phosphates condense to amorphous pyrophosphates at this temperature.

$^{27}$Al NMR spectra of MICRO-DRY® aluminum chlorhydrate solutions were similar to those reported by Pinnavaia in *Heterogeneous Catalysis;* Shapiro, B. Ed., Texas A&M University Press, College Station, Tex.; p. 145 (1985) and indicated that the solutions contained appreciable amounts of $Al(H_2O)_6^{3+}$ and polymerized species other than the aluminum Keggin ion. Thus, it is contemplated that while the Keggin ion is one of the pillaring species, other species may also be incorporated, and a combination of Keggin ion pillars and smaller species could be responsible for the stuffed character of the pillared zirconium phosphates.

EXAMPLE VIII

It was found that exchange of $Al(H_2O)_6^{3+}$ with the butylamine intercalates of α-zirconium phosphate yielded a product with a 9.4-angstrom interlayer spacing in agreement with the previously obtained $Al^{3+}$-exchange phase. A solution was then prepared which according to $^{27}$Al NMR spectra contained only the $Al_{13}$ Keggin ion. This was accomplished by electrolytically dissolving aluminum metal in an $AlCl_3$ solution. The end product (the pillared product) also had a 9.4-angstrom interlayer spacing. This suggests a breakdown of Keggin ions to simple $Al^{3+}$ ions and supports the idea that the stuffed condition may result from the pores, formed by the pillars, being filled by smaller species.

An important advantage of the process of the present invention is that relatively concentrated solutions may be used for treating the layered material. In contrast, the processes of the prior art require very dilute solutions. For example, U.S. Pat. No. 4,216,188 states that the concentration of montmorillonite in the starting colloidal solution should be very low, e.g., from about 100 mg/l up to about 800 mg/l. [Column 2, lines 5-10] Thus, the practice of the present invention reduces not only water or other solvent requirements, but also the size of equipment required to produce useful quantities of the pillared product.

The foregoing description has been directed to particular embodiments of the invention in accordance with the requirements of the United States patent statutes for the purposes of illustration and explanation. It will be apparent to those skilled in this art, however, that many modifications and changes in the compositions and methods set forth will be possible without departing from the scope and spirit of the invention. It is intended that the following claims be interpreted to embrace all such modifications and changes.

What is claimed is:
1. A process for pillaring a layered material which comprises:
    (a) preparing the layered material in the proton form;
    (b) intercalating an amine; and

TABLE 4

| Sample # | Sample Starting Material$^b$ | Surface Area$^a$ | Sorption (sampled degassed at 200° C.) | | | | | | | |
|---|---|---|---|---|---|---|---|---|---|---|
| | | | PFTBA | | Cyclohexane | | n-pentane | | H$_2$O | |
| | | | % wt | P/Po | % wt | P/Po | % wt | P/Po | % wt | P/Po |
| Al #158/9 | γ-TiP (cryst.) | 121 | — | — | 4.47 | 0.60 | — | — | 22.6 | 0.83 |
| Al #188 | α-TiP (12:17) | 169 | 34.0 | 0.74 | 13.0 | 0.58 | 3.70 | 0.57 | — | — |
| Al #199 | α-TiP (2.5:48) | 183 | 36.5 | 0.79 | — | — | — | — | — | — |
| Al #216$^d$ | α-ZrP (12:15) | 30 | 9.0 | 0.75 | — | — | — | — | — | — |
| Al #217$^e$ | α-ZrP (12:336) | 35 | — | — | — | — | — | — | — | — |
| Al #219$^f$ | α-ZrP (9:48) | 37 | — | — | — | — | — | — | — | — |

$^a$N$_2$ B.E.T.(m$^2$/g); degassed at 200° C.
$^b$Preparation indicated as: (concentration of phosphoric acid in moles per liter:reflux time in hours)
$^d$Sample "a" in FIG. 3
$^e$Sample "b" in FIG. 3
$^f$Sample "c" in FIG. 3

(c) displacing the intercalate with an inorganic pillaring substance.

2. A process as recited in claim 1 wherein the amine is butylamine.

3. A process as recited in claim 1 wherein the amine is a polyether amine.

4. A process as recited in claim 1 further comprising the step of heat treating the layered material subsequent to introduction of the pillaring substance.

5. A process as recited in claim 1 wherein preparing the layered material in the proton form comprises contacting the layered material with an acid.

6. A process as recited in claim 1 wherein the pillaring substance comprises a polyoxycation.

7. A process as recited in claim 1 wherein the pillaring substance comprises the Keggin ion.

8. A process for pillaring a layered material which does not appreciably swell in water comprising:
(a) swelling the layered material with an organic intercalate; and
(b) displacing the intercalate with an inorganic pillaring substance.

9. A process for pillaring a layered material which does not appreciably swell in water comprising:
(a) swelling the layered material with an organic intercalate comprising an amine, amide or dimethyl sulfoxide; and
(b) displacing the intercalate with an inorganic polyoxycation pillaring substance.

10. A process for pillaring a layered material which does not appreciably swell in water comprising:
(a) swelling the layered material with an organic intercalate comprising an amine, amide or dimethyl sulfoxide; and
(b) displacing the intercalate with an inorganic polyoxycation pillaring substance comprising an aluminum polymer, zirconium tetramer, chromium polymer or bismuth polymer.

11. A process as recited in claim 10, wherein the amine is an alkyl amine.

12. A process as recited in claim 10 wherein the amine is a polyether amine.

13. A process for pillaring a layered material which does not appreciably swell in water comprising:
(a) swelling the layered material with an organic intercalate comprising an alkyl amine or a polyether amine; and
(b) displacing the intercalate with an inorganic pillaring substance comprising one or more of the following polyoxycations:
$[Al_{13}O_4(OH)_{24} \cdot 12H_2O]^{7+}$, $[Zr(OH)_2 \cdot bH_2O]^{8+}$, $Cr_2(OH)_2^{4+}$, $Cr_3(OH)_4^{5+}$, $[Bi_6O_4(OH)_4]^{7+}$.

14. The process of claim 13 wherein the layered material comprises α-zirconium phosphates, γ-zirconium phosphates, α-titanium phosphates, or γ-titanium phosphates.

15. A process for pillaring a layered material, said layered material comprising α-zirconium phosphate, γ-zirconium phosphate, α-titanium phosphate, or γ-titanium phosphate, the process comprising:
(a) swelling the layered material with an intercalate comprising an alkyl amine or a polyether amine; and
(b) displacing the intercalate with an inorganic pillaring substance comprising one or more of the following polyoxycations:
$[Al_{13}O_4(OH)_{24} \cdot 12H_2O]^{7+}$, $[Zr(OH)_2 \cdot 4H_2O]^{8+}$, $Cr_2(OH)_2^{4+}$, $Cr_3(OH)_4^{5+}$, $[Bi_6O_4(OH)_4]^{7+}$.

* * * * *

UNITED STATES PATENT AND TRADEMARK OFFICE
CERTIFICATE OF CORRECTION

PATENT NO. : 5,017,537　　　　　　　　　　　Page 1 of 10
DATED　　 : May 21, 1991
INVENTOR(S) : Clearfield It is certified that error appears in the above-identified patent and that said Letters Patent is hereby corrected as shown below:

In column 1, line 32, please replace the chemical formulation "$[Zr(OH)_2 \cdot 12H_2O]_4^{8+}$" with the formulation --$[Zr(OH)_2 \cdot 4H_2O]_4^{8+}$--.

In column 2, line 41, please delete the period after "C".

In column 2, line 43, please delete the period after "C".

In column 3, line 68, please replace "allu" with --alu--.

In column 4, line 1, please replace the term "a" with --$\underline{a}$--.

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 4, line 5, please delete the period after "C".

In column 4, line 5, please replace "35" with --30--.

In column 4, line 5, please replace "b" with --$\underline{b}$--.

In column 4, line 9, please delete the period after "C".

In column 4, line 12, please replace the term "phisphoric" with the term --phosphoric--.

In column 4, line 13, please delete the period after "C".

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 4, line 56, please replace the term "$NH_4^{30}$" with the term --$NH_4^+$--.

In column 5, line 17, please replace "n" with --$\underline{n}$--.

In column 5, line 49, please replace the formulation "$[CH_3(CH_3(CH_2)_3NH_3^+]_2Zr(PO_4)_2$" with the formulation --$[CH_3(CH_2)_3NH_3^+]_2Zr(PO_4)_2$--.

In column 5, line 66, please replace "(hkl)" with --(hkℓ)--. (both Occur.)

In column 6, line 7, please replace "(hkl)" with --(hkℓ)--. (both occur.)

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 6, line 8, please replace "(202)" with --($20\bar{2}$)--.

In column 6, line 10, please replace "(604)" with --($60\bar{4}$)--.

In column 6, line 24, please replace "c" with --$\underline{c}$--.

In column 6, line 27, please replace "b" with --$\underline{b}$--; and replace "a" with --$\underline{a}$--.

In column 6, line 48, please replace "H2O" with --$H_2O$--.

In column 7, line 34, please replace the term "MICRO-DRY®" with the term --MICRO-DRY®--.

UNITED STATES PATENT AND TRADEMARK OFFICE
CERTIFICATE OF CORRECTION

PATENT NO. : 5,017,537
DATED : May 21, 1991
INVENTOR(S) : Clearfield

Page 5 of 10

It is certified that error appears in the above-identified patent and that said Letters Patent is hereby corrected as shown below:

In column 7, line 35, please replace the term "DRY®" with the term --DRY®--.

In column 7, line 38, please replace the term "DRY®" with the term --DRY®--.

In column 7, line 41, please replace the term "MICRO-DRY®" with the term --MICRO-DRY®--.

In column 7, line 42, please replace the formulation "$Al_2(OH)_5Cl \cdot nH_2O$" with the formulation --$Al_2(OH)_5Cl \cdot \underline{n}H_2O$--.

In column 7, line 43, please replace the term "MICRO-DRY®" with the term --MICRO-DRY®--.

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 7, line 46, please replace the formulation "$Na^{+Al(OH)4-}$" with --$Na^+Al(OH)_4^-$--.

In column 7, line 49, please replace the formulation "$Al(-H_2O)_6^{3+}$" with --$Al(H_2O)_6^{3+}$--.

In column 7, line 66, please replace the term "MICRO-DRY®" with the term --MICRO-DRY®--.

In column 8, line 5, please replace the term "MICRO-DRY®" with the term --MICRO-DRY®--.

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 8, line 16, please replace the term "MICRO-DRY®" with the term --MICRO-DRY®--.

In column 8, line 27, please delete the period after "C".

In column 8, line 55, please delete the period after "C".

In column 9, line 53, please delete the period after "C".

In column 9, line 65, please replace the term "Y-titanium" with --γ-titanium--.

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 10, line 1, please delete the period after "C".

In column 10, line 7, please delete the period after "C".

In column 10, line 22, please delete the period after "C".

In column 10, line 32, please delete the period after "C".

In column 10, line 51, please replace the term "a" with --$\underline{a}$--; and the term "b" with --$\underline{b}$--.

In column 10, line 53, please replace "c" with --$\underline{c}$--.

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 10, line 63, please replace "c" with --$\underline{c}$--.

In column 11, line 14, please replace "1," with --$\underline{1}$,--.

In column 11, line 22, please replace "a" with --$\underline{a}$--.

In column 11, line 23, please replace "b" with --$\underline{b}$--.

In column 11, line 35, please delete the period after "C".

In column 11, line 40, please delete the period after "C".

In column 11, line 62, please replace the term "MICRO-DRY®" with the term --MICRO-DRY®--.

UNITED STATES PATENT AND TRADEMARK OFFICE
CERTIFICATE OF CORRECTION

PATENT NO. : 5,017,537
DATED : May 21, 1991
INVENTOR(S) : Clearfield

It is certified that error appears in the above-identified patent and that said Letters Patent is hereby corrected as shown below:

In column 14, line 17, please replace the formulation "$[Zr(OH)_2 \cdot bH_2O]^{8+}$" with --$[Zr(OH)_2 \cdot 4H_2O]^{8+}$--.

Signed and Sealed this

Twenty-ninth Day of December, 1992

Attest:

DOUGLAS B. COMER

Attesting Officer      Acting Commissioner of Patents and Trademarks